(12) United States Patent
Poertner et al.

(10) Patent No.: US 9,216,613 B2
(45) Date of Patent: Dec. 22, 2015

(54) BICYCLE RIM WITH BRAKE TRACK

(75) Inventors: Josh Poertner, Indianapolis, IN (US);
David Morse, Des Moines, IA (US);
Michael Hall, Indianapolis, IN (US)

(73) Assignee: SRAM, LLC, Chicago, IL (US)

( * ) Notice: Subject to any disclaimer, the term of this patent is extended or adjusted under 35 U.S.C. 154(b) by 250 days.

(21) Appl. No.: 13/547,255

(22) Filed: Jul. 12, 2012

(65) Prior Publication Data

US 2014/0015307 A1    Jan. 16, 2014

(51) Int. Cl.
*B60B 21/08* (2006.01)
*B60B 1/00* (2006.01)
*B60B 1/02* (2006.01)
*B60B 5/02* (2006.01)

(52) U.S. Cl.
CPC ............. *B60B 21/08* (2013.01); *B60B 1/003* (2013.01); *B60B 1/02* (2013.01); *B60B 5/02* (2013.01); *B60B 2310/204* (2013.01); *B60B 2900/1212* (2013.01); *B60Y 2200/13* (2013.01); *B60Y 2200/134* (2013.01)

(58) Field of Classification Search
CPC ............ B60B 21/08; B60B 1/003; B60B 1/02
USPC ............. 301/95.106, 95.102, 95.103, 95.104; 29/894.33, 894.35, 894.351; 188/22, 188/24.11–26, 28, 31, 43, 45, 56, 2 D, 2 F, 188/73.1, 251 A, 251 R, 250 G, 250 B
See application file for complete search history.

(56) References Cited

U.S. PATENT DOCUMENTS

| 4,030,754 | A | * | 6/1977 | Merlette .................. 301/95.103 |
| 4,983,430 | A | * | 1/1991 | Sargent ........................ 428/34.1 |
| 5,184,874 | A | * | 2/1993 | Olson et al. ............. 301/64.705 |
| 5,249,846 | A | * | 10/1993 | Martin et al. ............ 301/95.102 |
| 5,486,223 | A | | 1/1996 | Carden |
| 5,975,645 | A | * | 11/1999 | Sargent ..................... 301/95.11 |
| 2003/0107260 | A1 | | 6/2003 | Ording |
| 2006/0267397 | A1 | * | 11/2006 | Possarnig et al. ........ 301/95.102 |
| 2007/0102992 | A1 | | 5/2007 | Jager |
| 2008/0296961 | A1 | * | 12/2008 | Dal Pra' .................. 301/95.103 |
| 2008/0315676 | A1 | * | 12/2008 | Cobb ....................... 301/95.102 |
| 2011/0039086 | A1 | | 2/2011 | Graham |
| 2011/0089750 | A1 | * | 4/2011 | Colegrove et al. ....... 301/95.102 |

FOREIGN PATENT DOCUMENTS

EP          2322357          5/2011

* cited by examiner

*Primary Examiner* — S. Joseph Morano
*Assistant Examiner* — Jean Charleston
(74) *Attorney, Agent, or Firm* — Milan Milosevic; Lisa Serdynski

(57) ABSTRACT

A FRP rim for a bicycle, including a radially outer tire-engaging portion and a radially inner spoke-engaging portion. A first sidewall is in a spaced configuration with a second sidewall. The first and second sidewalls extend between the radially outer tire-engaging portion and the radially inner spoke-engaging portion. A brake track is disposed on each of the first and second sidewalls including a layer of microparticles.

19 Claims, 5 Drawing Sheets

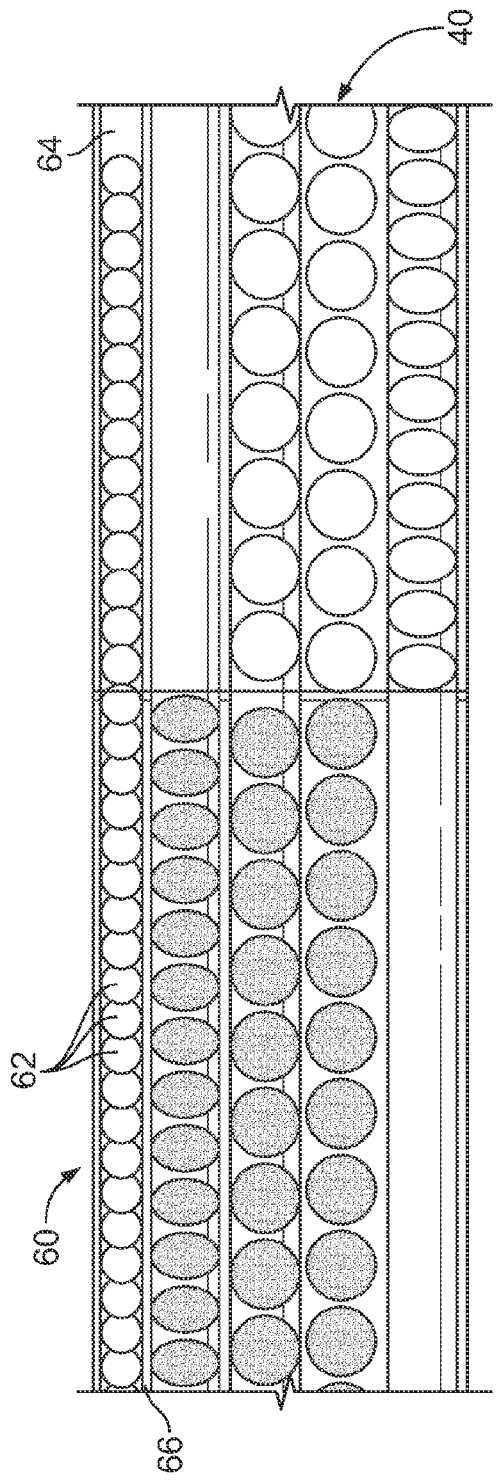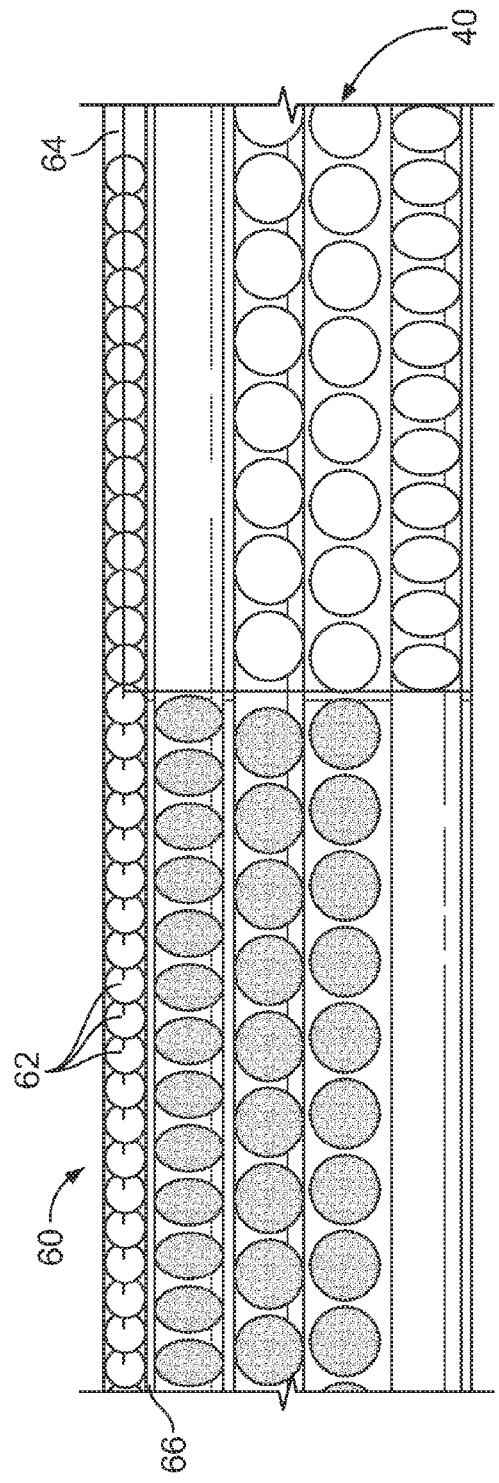

BICYCLE RIM WITH BRAKE TRACK

BACKGROUND OF THE INVENTION

This present invention relates to bicycle rims, and more particularly, to a bicycle rim having a brake track.

Bicycle wheels and rims have been in use for well over a century, Historically, most bicycle rims have been made of steel or aluminum. However, in the past few decades, some bicycle rim manufacturers have begun to produce bicycle rims from other materials, such as lightweight fiber-reinforced plastics (FRPs), including carbon-fiber, fiberglass, and nylon fibers, that are mixed in a resin such as epoxy-based resins, phenolic-based resins and/or ester-based resins. Of these composite rims, some have been made entirely of FRP composite materials ("full composite wheels"), whereas others have incorporated components of different materials in addition to FRP composites "multi-component rims").

Carbon fiber rim brake surfaces have been difficult to design. Early carbon rims used the molded surface of the rim as a brake track or braking surface, which was generally troublesome since the as-molded rims typically had a thin layer of mold release embedded in the surface, the presence of which was not suitable for a braking surface since mold release materials yield a low coefficient of friction. The mold release layer is used to remove the rim from the mold during manufacturing. After a short period of brake use, the mold release and outer layer of epoxy on the rim wore away, exposing the vulnerable carbon fiber beneath. Carbon surfaces are relatively poor at resisting wear and enhancing frictional performance. Thus, carbon fiber surfaces are generally unsuitable as brake tracks for FRP rims.

Later rims use fiberglass, quarts fiber, or Kevlar fibers in the brake track. All these materials have better wear characteristics than carbon and provide varying degrees of improved braking performance. Kevlar is quite good as a frictional material but is subject to moisture wicking which can lead to delamination from the rim. Kevlar has only average wear characteristics in the field once exposed to wet conditions or abrasive road grit which can contain concrete or asphalt particles, as well as dirt and sand which can embed in the brake pad causing extreme and rapid rim wear. Fiberglass and quartz are average in frictional performance and in wear performance, while also being inexpensive, but these materials can be heavy without providing additional strength or toughness to the product.

One approach to provide a good brake track involves removal of the epoxy and mold release from the brake track area. This is accomplished through a mechanical abrasion of the rim surface that both removes the mold release and improves parallelism or alignment of the brake tracks. Later generations of rims have used a veil of silicon fibers mixed with glass. The silicon fibers are harder than glass and offer significantly improved wear performance as well as brake 'feel' but are very expensive, difficult to work with due to high fiber stiffness and add considerable manufacturing cost. While modern aircraft and auto racing brakes are currently being made from silicon carbide fibers, these materials are currently quite expensive, hard to process and are difficult to form into smaller radii, especially in a manufacturing setting. This lack of pliability limits their application to rim design and potentially prohibits use for certain complex rim shapes.

Some rim manufacturers have experimented with post-applied 'ceramic' brake track coatings. These range from painted-on applications that are heat cured, to plasma-sprayed coatings. All of these coatings offer aggressive frictional surfaces but suffer from being very brittle, heavy and generally requiring high temperature application procedures that can damage the molded rim. These coatings also suffer from geometric application issues, since being post-applied, the brake surfaces are inherently imperfect and non-parallel due to lack of geometric control.

There is a demand, therefore, to provide a bicycle, rim with a durable and cost-effective brake track with excellent braking characteristics. The invention satisfies the demand with minimal effect on rim weight and tire-mounting effort.

SUMMARY OF THE INVENTION

The invention involves the application to a FRP rim a track of microparticles of silicon carbide, or the like, suspended fully or partially in a layer of high temperature, high toughness epoxy resin. Silicon carbide (SiC) is one of the hardest materials commercially available. In fibrous form, the high stiffness of silicon carbide limits its application to objects with generally planar or simple geometries since the fibers are generally inflexible. The stiffness of silicon carbide fibers make this material difficult to work with and difficult to form into a bicycle rim brake track in a production environment. But it has been found that the use of silicon carbide, or the like, in a non-fibrous form more easily conforms to various rim shapes and is much easier to manipulate and prepare in an efficient manner without compromising braking performance when applied to a FRP rim.

The invention includes, in one embodiment, a brake track including an outer layer of epoxy resin containing a percentage of silicon carbide (SiC) or a similar material, in a particle form such as microspheres, applied to the brake track area of a rim. The nature of the SiC loaded epoxy film is such that the difficulties of working with SiC fiber are avoided. For example, SiC fiber is nearly impossible to cut into shapes or forms using traditional tooling such as razor knives or electric scissors, since the SiC fiber is 30-50% harder than a traditional razor knife.

The finished, molded brake surface using the embedded SiC microparticles in the epoxy matrix offers significant benefits over previous designs. The brake surface is conformable to any geometry; there is no minimum radius of curvature, or tooling limitations to this design. The SiC brake surface can be 'tuned' for optimal brake performance and 'feel' by varying a number of variables, such as particle size, the percentage of particles in the resin, the morphology of the particles and others. The resulting braking surface has been found to be nearly as durable as SiC fiber at a lower cost. For handling and operational purposes within a factory setting, the invention also contemplates a thin fiberglass veil material that is overlaid with the embedded SiC epoxy that tends to ease manipulation and handling of the SiC epoxy as it is less delicate and even easier to cut and process.

The final rim shows a novel structural cross section. Whereas a typical rim includes carbon fiber layers covered in glass or Kevlar® coated in epoxy, or a rim with the epoxy etched off the surface (revealing either carbon then glass or Kevlar® as the outer surface), the inventive rim shows a field or matrix of SiC microparticles fully wetted by the epoxy layer. One alternative embodiment involves the abrasion or etching away of the outer part of the epoxy matrix to expose the microparticles on the outer brake surface. In an alternative embodiment, it is also possible to control the density of the SiC particles as well as add additional layers of SiC particles for improved durability or product longevity.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 3 is a cross-sectional view of the structure of FIG. 2;

FIG. 4 is a cross-sectional view of the structure of FIG. 5;

DETAILED DESCRIPTION OF THE PREFERRED EMBODIMENTS

Preferred embodiments of the invention will herein be described with reference to the drawings. It will be understood that the drawings and descriptions set out herein are provided for illustration only and do not limit the invention as defined by the claims appended hereto and any and all their equivalents.

Figure 1:
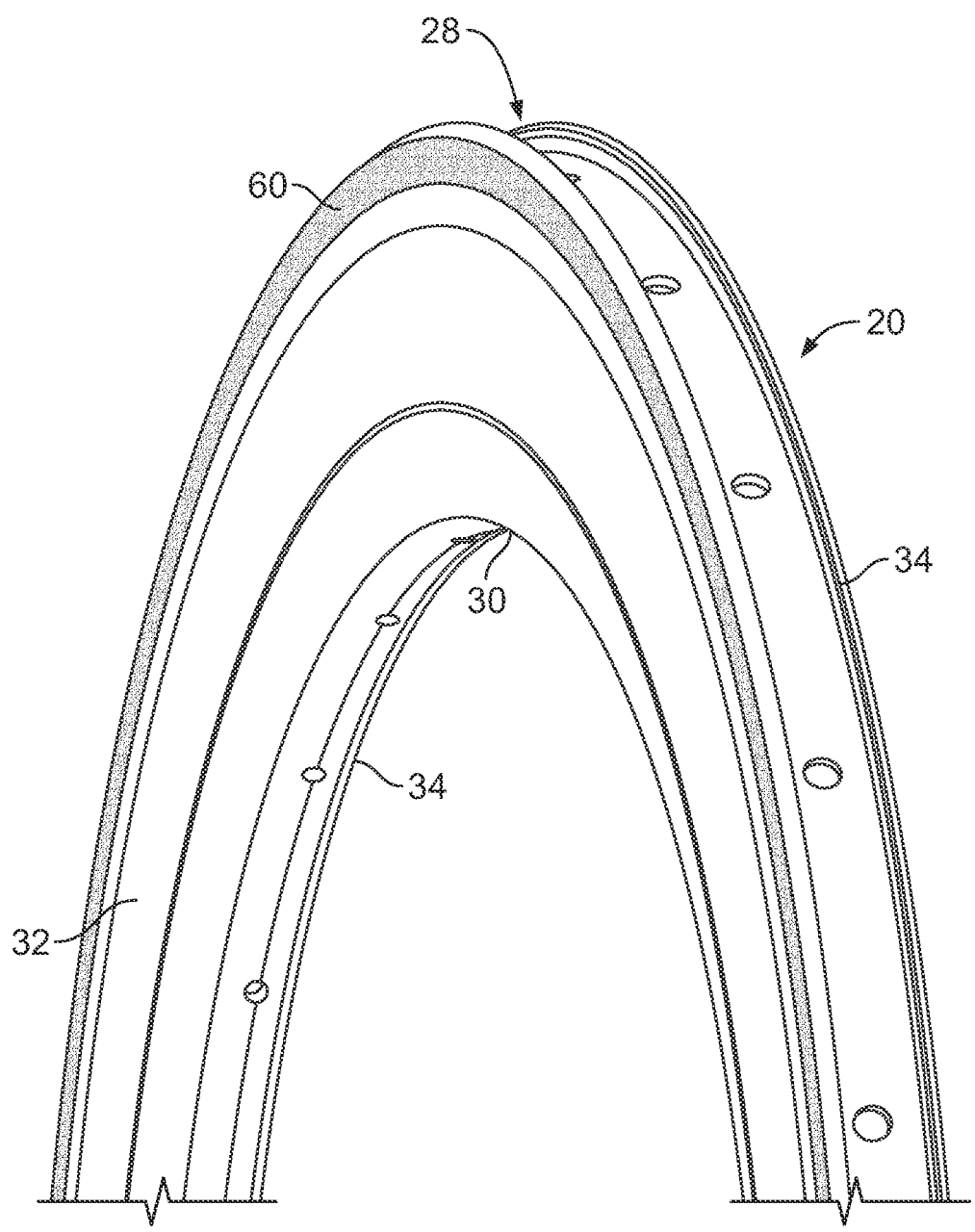
FIG. 1 is a partial perspective view of a bicycle rim with a brake track according to an embodiment of the invention.

FIG. 1 shows a wheel rim 20 with a brake track 60 according to the invention. The rim 20 generally includes a radially outer tire-engaging portion 28, a radially inner spoke-engaging portion 30, a first sidewall 32 and a second sidewall 34 spaced apart from the first sidewall. The first and second sidewalls 32, 34 extend generally radially between the tire-engaging and spoke-engaging portions 28, 30 to form the shape of the rim 20 or a portion thereof. It will be understood that any shaped FRP rim that includes a portion capable of functioning as a brake track is contemplated by the invention.

The brake track 60 is positioned in a conventional location on the first and second sidewalls 32, 34. A clincher type rim 20 is shown, but the invention contemplates non-clincher type rims, e.g., tubular or sew-up style rims (not shown). The tire-engaging and spoke-engaging portions 28, 30 and first and second sidewalls 32, 34 may form a toroid. In the illustrated embodiment, the rim 20 will be considered to be made of FRP, i.e., fiber-reinforced plastic, in one embodiment of carbon fiber, although it will be understood that a wide variety of materials and combinations of materials may be used to form the fiber-reinforced rim.

Figure 2:
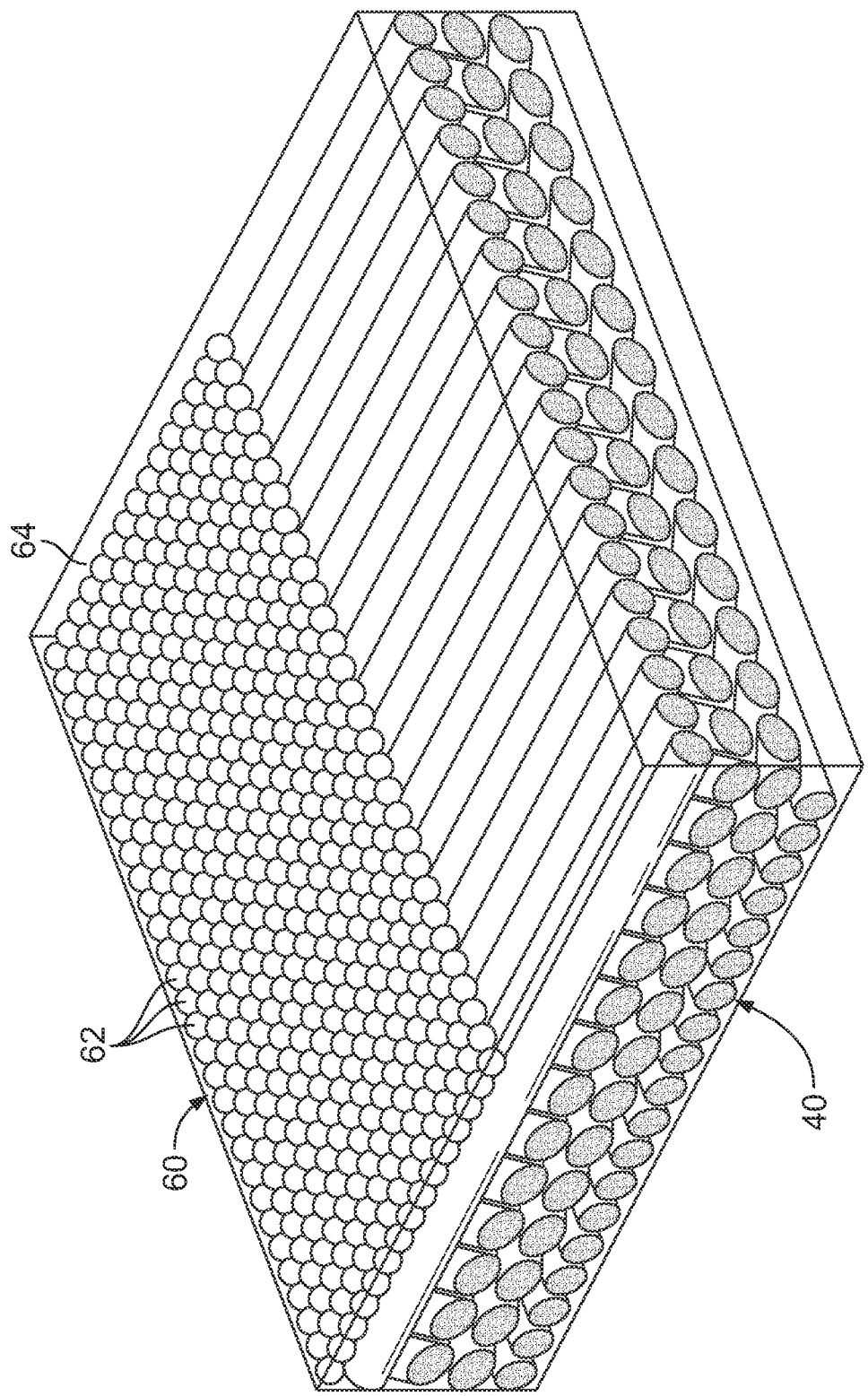
FIG. 2 is a perspective view of a section of brake track and a simplified underlying carbon structure.

FIGS. 2 and 3 include a fiber fabric/epoxy resin prepreg stack 40, as is well known, shown highly simplified, but generally depicting a small section of sidewall of a FRP wheel rim. The stack 40 may be considered a substrate for the material or layer forming the brake track 60. The brake track layer 60, which includes a combination of microparticles 62 and epoxy 64, resides on the outer surface of the rim where it can be contacted by a brake pad material. The brake track layer 60 overlies layers of fiber reinforced plastic 40 laid as depicted in alternating directions. Of course, the fiber/resin stack 40 can be any suitable arrangement of FRP materials that form the rim and support the brake track 60. In the illustrated embodiment of FIGS. 2 and 3, the microparticles 62 are depicted as being wholly contained by the epoxy resin 64 within the brake track 60.

The microparticles 62 in the brake track 60 may be any type of high hardness material, such as for example, ceramic materials, silicon carbide, silicon nitride, aluminum oxide, boron carbide, titanium oxide, emery, or other materials having a suitable hardness and in a particulate form capable of being adapted or formed to the shape of the rim 20. High hardness metallic particles could also be substituted, though they may not exhibit the same longevity as the above noted family of materials. The shapes of the microparticles may be generally compact, rounded, spherical, angular, amorphous, platelet, or any other suitable non-fibrous shape conformable to various rim shapes, especially in a manufacturing setting.

Accordingly, one can readily fine tune the braking performance of the rim, as the brake track 60 can be modified with different or alternative combinations of materials in any suitable weight percentages. Changing the particulate morphology also has the potential to vary the surface coefficient of friction of the brake track 60, allowing the brake track surface to be tuned for stopping power and/or modulation. Some of the above-listed brake track particulate materials also have high thermal conductivity, and/or high thermal resistance—each of which could be used to better manage heat within the epoxy matrix in a desirable fashion.

Figure 5:
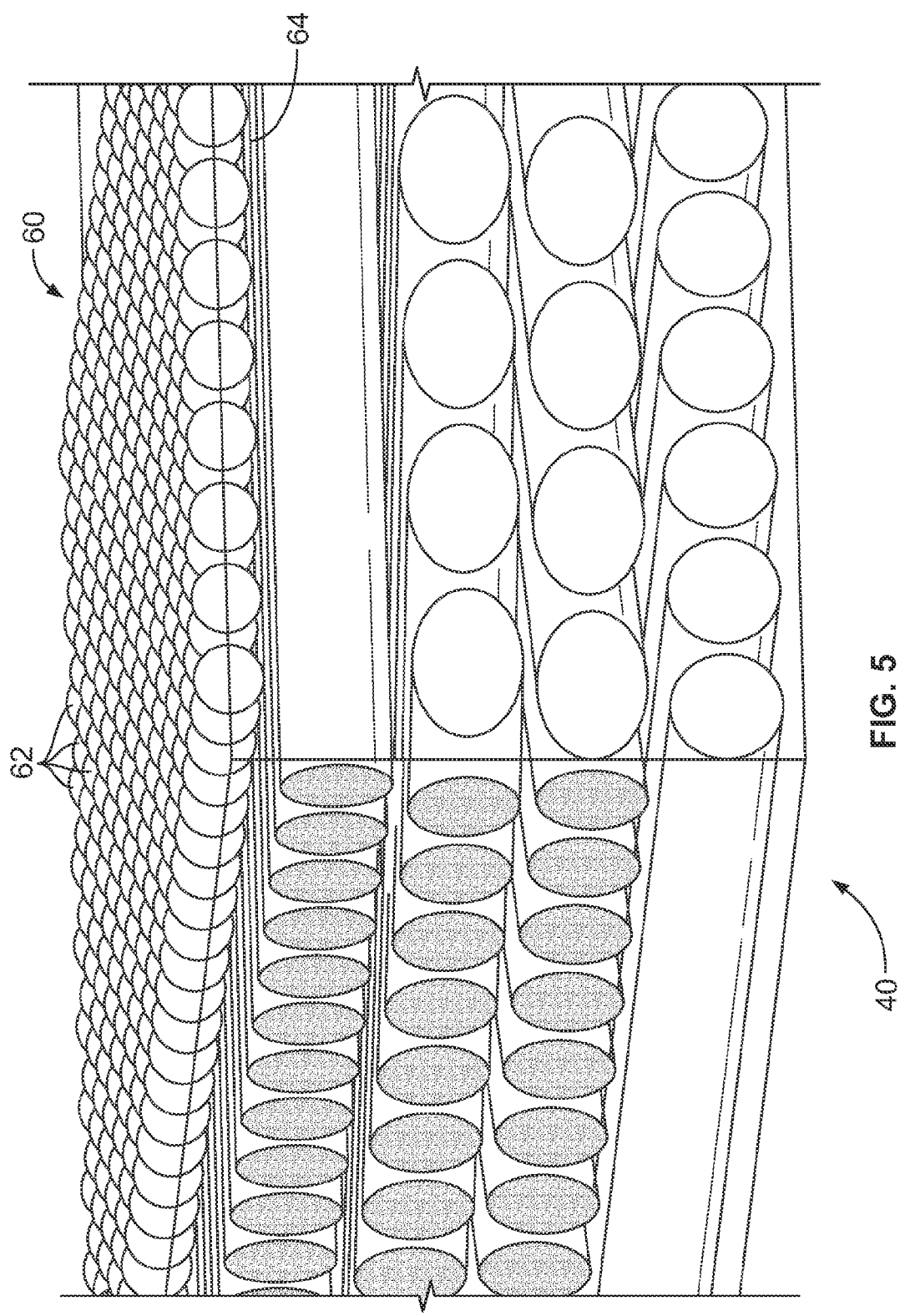
FIG. 5 is a perspective view of a section of brake track and a simplified underlying carbon structure with some of the resin removed to expose the brake track material.

Turning to FIGS. 4 and 5, the brake track 60 can be modified before use by removing an amount of epoxy 64 from the brake track 60 to fine tune the coefficient of friction of the brake track as well as the surface topography. In this manner, the FRP can be optimized for wet-weather braking.

In particular, FIGS. 4 and 5 show a fibrous fabric/epoxy resin prepreg stack 40, as shown in FIGS. 2 and 3. The stack 40 may be considered, in addition to being the structural component of the rim 20, as a substrate for the brake track 60. The brake track 60 includes a combination of microparticles 62 and epoxy 64 that resides on the outer surface of the rim 20 where it can be contacted by a brake pad material. The layer of brake track material 60 overlies layers of fiber reinforced plastic 40 laid in the desired alternating directions. The fiber/resin stack 40 can be formed of any suitable arrangement of FRP materials. In the embodiment of FIGS. 4 and 5, the microparticles 62 are depicted as being exposed by the partial removal of the epoxy resin matrix 64 containing the microparticles.

To make an embodiment of the rim 20 according to the invention, the material of brake track 60 is created by combining an amount of microparticles 62 with epoxy 64. This brake track material 60 may be as simple as epoxy 64 that has been mixed with a suitable percentage of microparticles 62 and formed into a film and in one embodiment laid onto a fine veil or scrim 66 of carbon, quartz, polyester, fiberglass, Kevlar® or other suitable material. This epoxy film or scrim layer 66 may then be cut into strips or arcs which can be laminated directly onto an uncured fiber-reinforced epoxy rim. Some molding methods would also allow the micro-particle loaded film to be applied directly to the surface of the tool before the tool receives the uncured material. The tool would be then closed and heat and pressure applied to cure the fiber reinforced epoxy structure as well as the micro-particle loaded epoxy brake surface 60. After a sufficient amount of time, e.g., generally from thirty minutes to two hours of cure time, the cured rim 20 would be removed from the mold, excess resin would be removed and the rim would be ready to have the outmost part of the epoxy of the brake track 60 removed to expose the microparticles 62. This step may not be necessary but wet weather braking performance on a new carbon fiber rim is typically poor and the surface may take weeks to months to 'break in' as brake pads slowly abrade away the epoxy 64 to expose the microparticles 62 embedded within. In one embodiment, therefore, the epoxy 64 covering the microparticles 62 is lightly abraded away in an abrasive blasting operation. This blasting can be fine-tuned using a media such as garnet which is harder than the epoxy resin but less hard than the abrasive particulates molded into the brake surface. Other materials may be used to remove the epoxy covering such as walnut shells, a less aggressive abrasive agent than garnet removing less epoxy, thereby producing a less aggressive brake track surface.

The range of microparticles 62 to epoxy resin 64 is preferably about 5-60% abrasive microparticles, by weight. At concentrations below about 5% there is little to no measurable effect in performance or durability of the rim. At higher concentrations, there is dramatically improved braking performance and durability, but can come at the expense of the surface becoming brittle or overly aggressive. While effective as a braking surface, too high a concentration of microparticles 62 will tend to generate excessive heat under braking and may quickly wear out standard brake pads used on bicycles. The particle size of the microparticles 62 is preferably less than about 0.1 mm.

Figures 6, 7:
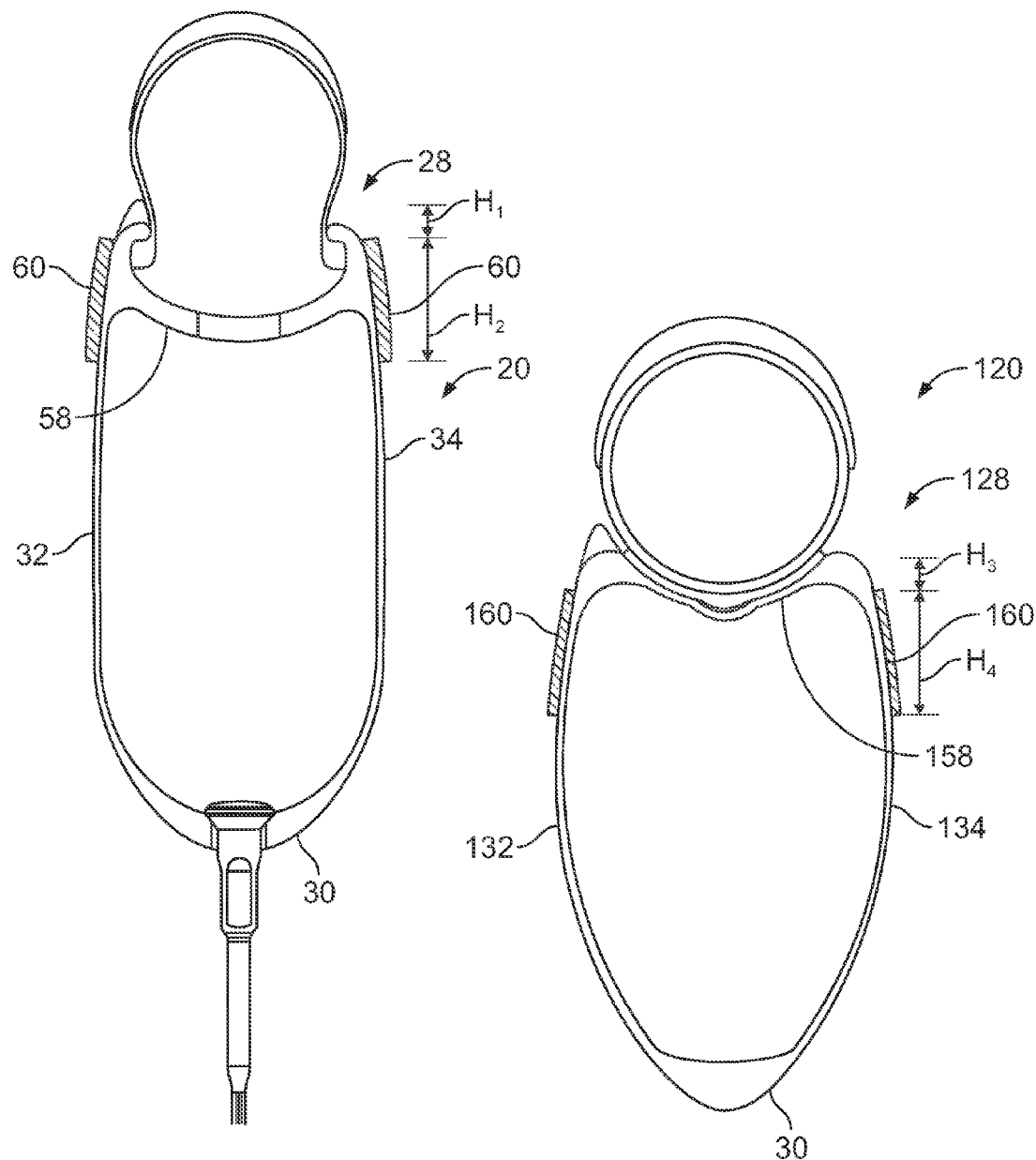
FIG. 6 is a cross-sectional view of a clincher rim according to an embodiment of the invention.
FIG. 7 is a cross-sectional view of a tubular rim according to another embodiment of the invention.

FIG. 6 is a clincher type wheel rim 20, with a brake track 60 according to the invention. The rim 20 generally includes a radially outer tire-engaging portion 28, a radially inner spoke-engaging portion 30, a first sidewall 32 and a second sidewall 34 spaced apart from the first sidewall. The first and second sidewalls 32, 34 extend generally radially between the tire-engaging and spoke-engaging portions 28, 30 to form the shape of the rim 20. The brake track 60 has a height $H_2$ of about 9-11 mm, preferably about 10.5 mm, and is located about 1-3 mm from the outer most extent of the outer tire-engaging portion 28, which is a height indicated by $H_1$. In the illustrated embodiment, the brake track 60 is disposed proximate or extends both above and below the span or cross member 58 of the tire-engaging portion 28 that extends between the first sidewall 32 and the second sidewall 34. In one embodiment, the brake track 60 generally intersects the FRP cross member 58 The thickness of the brake track 60 is not to scale. The width of the rim 20 from the first sidewall 21 to the second sidewall 34 at the brake track 60 is from about 19-24 mm. Therefore, the ratio of the height of the brake track 60 to the width of the rim 20 is about 1:2.

FIG. 7 is a tubular type wheel rim 120, with a brake track 160 according to another embodiment of the invention. The rim 120 generally includes a radially outer tire-engaging portion 128, a radially inner spoke-engaging portion 130, a first sidewall 132 and a second sidewall 134 spaced apart from the first sidewall. The first and second sidewalls 132, 134 extend generally radially between the tire-engaging and spoke-engaging portions 128, 130 to form the shape of the rim 120. The brake track 160 has a height $H_4$ of about 9-11 mm, preferably about 10.5 mm, and is located about 1-3 mm from the outer most extent of the outer tire-engaging portion 128, a height indicated by $H_3$. In one embodiment, the brake track 160 is proximate or begins at and extends below (radially inwardly) the span or cross member 158 of the tire-engaging portion 128 that extends between the first sidewall 132 and the second sidewall 134. In one embodiment, the brake track 160 generally intersects the FRP cross member 158. The thickness of the brake track 160 is not to scale. The width of the rim 120 from the first sidewall 132 to the second sidewall 134 at the brake track 160 is from about 19-24 mm. Therefore, the ratio of the height of the brake track 160 to the width of the rim 120 is about 1:2.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A FRP rim for a bicycle, comprising:
   a radially outer tire-engaging portion;
   a radially inner spoke-engaging portion;
   a first sidewall;
   a second sidewall spaced apart from the first sidewall, the first and second sidewalls extending inwardly of the radially outer tire-engaging portion; and
   a brake track disposed on the first and second sidewalls, the brake track comprising an outermost layer of microparticles partially embedded in an epoxy matrix and partially exposed, the brake track including a non-metallic veil disposed below the layer of microparticles.

2. The rim of claim 1, wherein the first and second sidewalls extend between the radially outer tire-engaging portion and the radially inner spoke-engaging portion.

3. The rim of claim 1, wherein the microparticles are microspheres.

4. The rim of claim 1, wherein the microparticles are high hardness particles.

5. The rim of claim 4, wherein the high hardness particles are made of one or more of silicon carbide, silicon nitride, aluminum oxide, boron carbide, titania, emerundum, and ceramic.

6. The rim of claim 4, wherein the high hardness particles are metallic particles.

7. The rim of claim 1, wherein the microparticles are one or more compact, rounded, spherical, angular, amorphous, and platelet in shape.

8. The rim of claim 1, wherein the microparticles of the brake track comprise about 5-60% by weight of the epoxy matrix.

9. The rim of claim 1, wherein the microparticles have a particle size of less than about 0.05 mm.

10. The rim of claim 1, wherein the veil comprises one or more of fiberglass, carbon, quartz, Kevlar and polyester.

11. The rim of claim 10, wherein the veil is combined with an epoxy matrix and an effective amount of the microparticles.

12. The rim of claim 1, wherein the microparticles have one or both of high thermal conductivity and high thermal resistance.

13. The rim of claim 1, wherein the microparticles have a shape and size conformable to the shape of the rim.

14. The rim of claim 1, wherein the rim is a clincher rim.

15. The rim of claim 1, wherein the rim is a tubular rim.

16. The rim of claim 1, wherein the rim includes a carbon-fiber reinforced material.

17. The rim of claim 1, wherein the ratio of a height of the brake track to a width of the rim at the brake track is about 1:2.

18. The rim of claim 1, wherein the brake track is disposed on the first and second sidewalls proximate an FRP cross member.

19. The rim of claim 18, wherein the brake track generally intersects a plane of the FRP cross member.

* * * * *